United States Patent
Gainey, Jr. et al.

(10) Patent No.: US 7,940,785 B2
(45) Date of Patent: May 10, 2011

(54) ETHERNET ADAPTER PACKET MANAGEMENT

(75) Inventors: Charles W. Gainey, Jr., Poughkeepsie, NY (US); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 11/621,097

(22) Filed: Jan. 8, 2007

(65) Prior Publication Data
US 2008/0165777 A1 Jul. 10, 2008

(51) Int. Cl.
*H04L 12/56* (2006.01)
(52) U.S. Cl. ..................... 370/412
(58) Field of Classification Search .................. None
See application file for complete search history.

(56) References Cited

U.S. PATENT DOCUMENTS

| | | | |
|---|---|---|---|
| 6,021,419 | A | 2/2000 | Clarke, Jr. et al. |
| 6,163,812 | A | 12/2000 | Gopal et al. |
| 6,334,154 | B1 | 12/2001 | Gioquindo et al. |
| 6,381,648 | B1 | 4/2002 | Broberg, III et al. |
| 6,681,258 | B1 | 1/2004 | Ratcliff et al. |
| 6,798,788 | B1 | 9/2004 | Viswanath et al. |
| 6,920,153 | B2 | 7/2005 | Ellis et al. |
| 2002/0015406 | A1 | 2/2002 | Sun et al. |
| 2003/0204648 | A1* | 10/2003 | Arndt .................. 710/5 |
| 2003/0210653 | A1 | 11/2003 | Pan |
| 2004/0196840 | A1* | 10/2004 | Amrutur et al. ......... 370/389 |
| 2004/0213211 | A1 | 10/2004 | Green |
| 2005/0053060 | A1 | 3/2005 | Pettey |
| 2005/0097051 | A1 | 5/2005 | Madill, Jr. et al. |
| 2005/0097608 | A1 | 5/2005 | Penke et al. |
| 2005/0129040 | A1* | 6/2005 | Kiel et al. ............ 370/412 |

OTHER PUBLICATIONS

Armstrong et al., "Advanced Virtualization Capabilities of POWER5 Systems", IBM Journal of Research and Development, vol. 49, No. 4/5, p. 523-532, Jul./Sep. 2005.

Loeser et al., "Low-Latency Hard Real-Time Communication over Switched Ethernet", Proceedings: 16th Euromicro Conference on Real-Time Systems, 2004, p. 13-22.

IBM TDB, "LCE Daemon and its Use of Threads to Maintain Connections to Multiple pSeries eServers", IP.com Prior Art Database, Jul. 23, 2001, p. 1249.

\* cited by examiner

*Primary Examiner* — Chirag G Shah
*Assistant Examiner* — Yong Zhou
(74) *Attorney, Agent, or Firm* — Yee & Associates, P.C.; Wenjie Li (57) ABSTRACT

A method, computer program product, and system for managing packets received by an Ethernet adapter shared by a plurality of threads are provided. The method, computer program product, and system provide for a first function operable to add a connection to a connection table of the Ethernet adapter and associate the connection with a queue pair and a second function operable to remove the connection from the connection table of the Ethernet adapter, wherein the Ethernet adapter is operable to route any packet corresponding to the connection received by the Ethernet adapter to the queue pair associated with the connection responsive to the connection being in the connection table.

20 Claims, 5 Drawing Sheets

ETHERNET ADAPTER PACKET MANAGEMENT

FIELD OF THE INVENTION

The present invention relates generally to Ethernet adapters. More particularly, the present invention is directed to packet management in Ethernet adapters

BACKGROUND OF THE INVENTION

When an Ethernet adapter is shared by multiple threads executing on different logical partitions of a virtualized system, an operating system of each logical partition usually acts as a recipient for all packets destined for various threads in the corresponding logical partition. Packets are then re-routed by the operating system of each partition to the appropriate thread in the corresponding partition. This, however, can create a bottleneck at the operating system in each partition.

In addition, threads that require preferential treatment may not be able to obtain priority sorting because each operating system typically handles packets based on order of arrival. Further, bandwidth and/or response requirements of some threads may not be met if the corresponding operating system is unable to process the packets quick enough. Moreover, one thread could potentially flood the overall flow of packets with, for instance, ping traffic, thereby creating a form of a denial-of-service attack.

SUMMARY OF THE INVENTION

A method, computer program product, and system for managing packets received by an Ethernet adapter shared by a plurality of threads are provided. The method, computer program product, and system provide for a first function operable to add a connection to a connection table of the Ethernet adapter and associate the connection with a queue pair and a second function operable to remove the connection from the connection table of the Ethernet adapter, wherein the Ethernet adapter is operable to route any packet corresponding to the connection received by the Ethernet adapter to the queue pair associated with the connection responsive to the connection being in the connection table. The first function and the second function are invocable by the plurality of threads sharing the Ethernet adapter.

DETAILED DESCRIPTION

The present invention relates generally to Ethernet adapters and more particularly to packet management in Ethernet adapters. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

Computer systems can be virtualized (e.g., divided) into multiple logical partitions. Each logical partition (LPAR) includes a portion of a computer system's resources, such as processor, memory, storage, etc., and can operate independently with its own operating system and other applications. Virtualized computer systems usually include a host (sometimes referred to as a hypervisor) that controls allocation of system resources among logical partitions. A hypervisor or host can be implemented as firmware on a computer system.

An Ethernet adapter may be provided in a computer system to enable applications to communicate with a network, such as a local area network (LAN). The Ethernet adapter typically includes a physical port that facilitates communication with the network and a number of logical ports, each of which can be assigned to a logical partition of the computer system, thereby providing accessibility to the physical port and thus to the network. A logical partition usually includes a default queue pair (QP), i.e., a receive queue and a send queue, and may include one or more other queue pairs. Portions of a partition of system memory allocated to the logical partition can serve as queues.

On each logical partition of a computer system, multiple threads can be executing in parallel. A thread may be an application or a sequence of instructions within an application. Generally, all packets destined for threads in a logical partition are first placed in a default QP of the logical partition. An operating system of the logical partition is then charged with re-routing each packet to the correct thread in the partition.

Directing all packets destined for threads in the logical partition to the default QP, however, can create a bottleneck if the operating system is not able to process the packets quickly enough. In addition, because packets are typically handled in a first in, first out (FIFO) basis, priority sorting for certain threads that require preferential treatment is not possible. Further, some threads have bandwidth and/or response requirements that cannot be met because the rate at which packets in the default QP are being processed is below the requirements. Moreover, having all packets directed to the default QP makes the logical partition vulnerable to denial-of-service attacks by a thread in the logical partition, For example, the thread can flood the overall flow with ping traffic.

Figure 1:
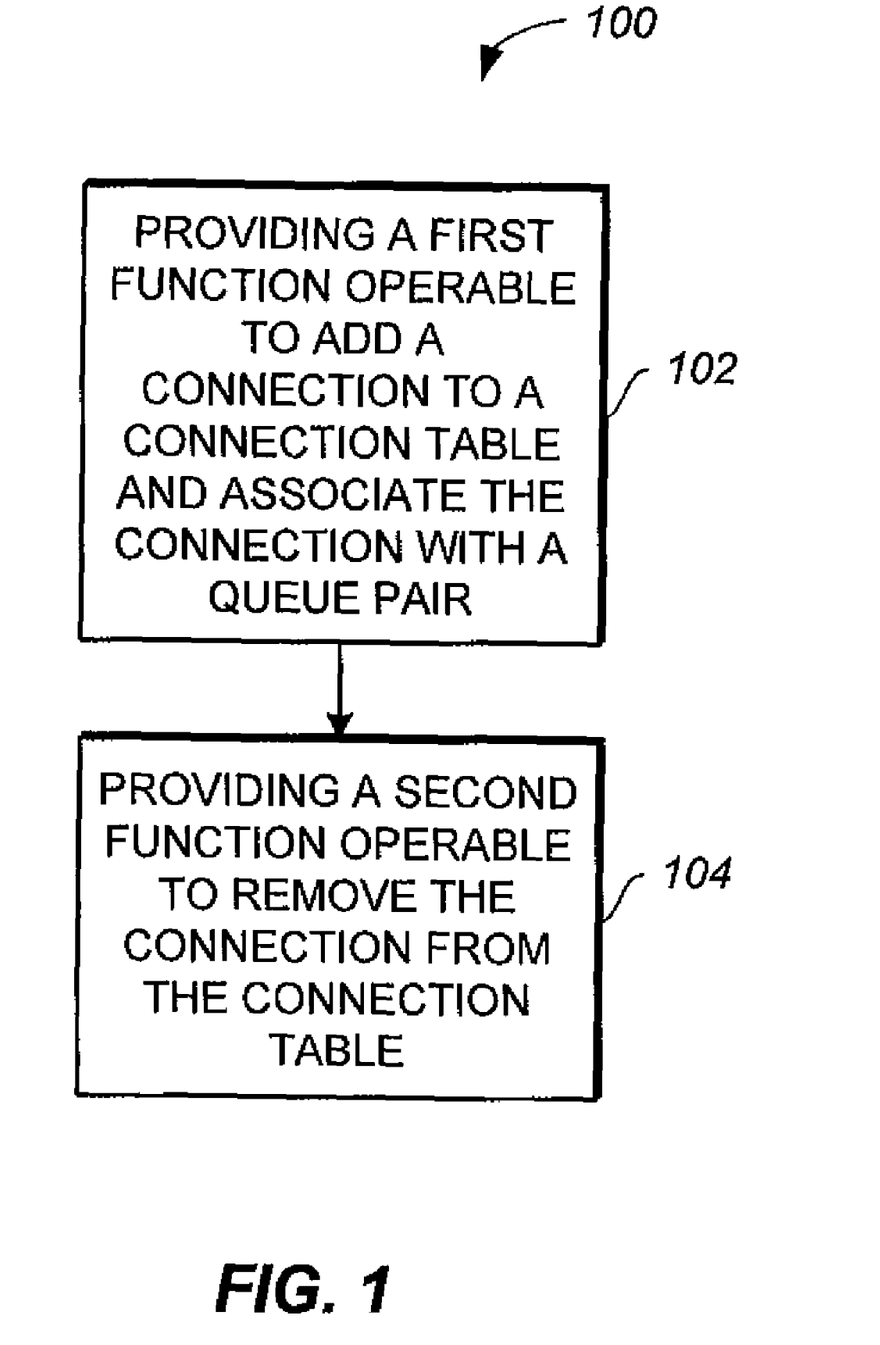
FIG. 1 depicts a process flow of a method for managing packets received by an Ethernet adapter according to an implementation of the invention.

FIG. 1 depicts a process 100 for managing packets received by an Ethernet adapter shared by a plurality of threads according to an implementation of the invention. At 102, a first function operable to add a connection to a connection table of the Ethernet adapter and associate the connection with a queue pair is provided. In one implementation, the queue pair includes a receive queue and a send queue. A second function operable to remove the connection from the connection table of the Ethernet adapter is provided at 104.

The first function and the second function are hypervisor calls in one implementation. In another implementation, the first function and the second function each includes one or more fields identifying the connection (e.g., a source address field and a destination address field) and at least one other field specifying a queue pair identifier.

In the implementation of FIG. 1, the Ethernet adapter is operable to route any packet corresponding to the connection received by the Ethernet adapter to the queue pair associated with the connection responsive to the connection being in the connection table. The first function and the second function are invocable by the plurality of threads sharing the Ethernet adapter.

A connection cache is also included in the Ethernet adapter in one implementation. The connection cache is operable to store most recently used connections from the connection table of the Ethernet adapter. In one implementation, the first function is further operable to lock the connection in the connection cache of the Ethernet adapter. Locking the connection prevents a connection cache entry storing information relating to the connection from being deleted to make room for a connection table entry being loaded into the connection cache.

In one implementation, the plurality of threads are executing on a plurality of logical partitions. A thread may be an application executing on one of the plurality of logical partitions. A thread may also be a sequence of instructions within an application executing on one of the plurality of logical partitions.

By providing the above functions, threads sharing an Ethernet adapter are able to add connections to a connection cache of the Ethernet adapter and associate those connections with queue pairs. This, in turn, allows the Ethernet adapter to route packets to the appropriate threads, which should be quicker than an operating system re-routing packets since it is hardware rather than software. In addition, priority sorting and bandwidth/response requirements are no longer of any concern because a thread is able to not only have its own queue pair, but associate a different queue pair for each connection it adds to the connection cache.

Furthermore, it will not be possible for a thread to flood the overall flow of packets to create a form of denial-of-service attack as another thread can simply use a different queue pair for its packets. Moreover, performance can be optimized if an operating system kernel is bypassed and network stack processing is performed directly by an application layer.

Figure 2:
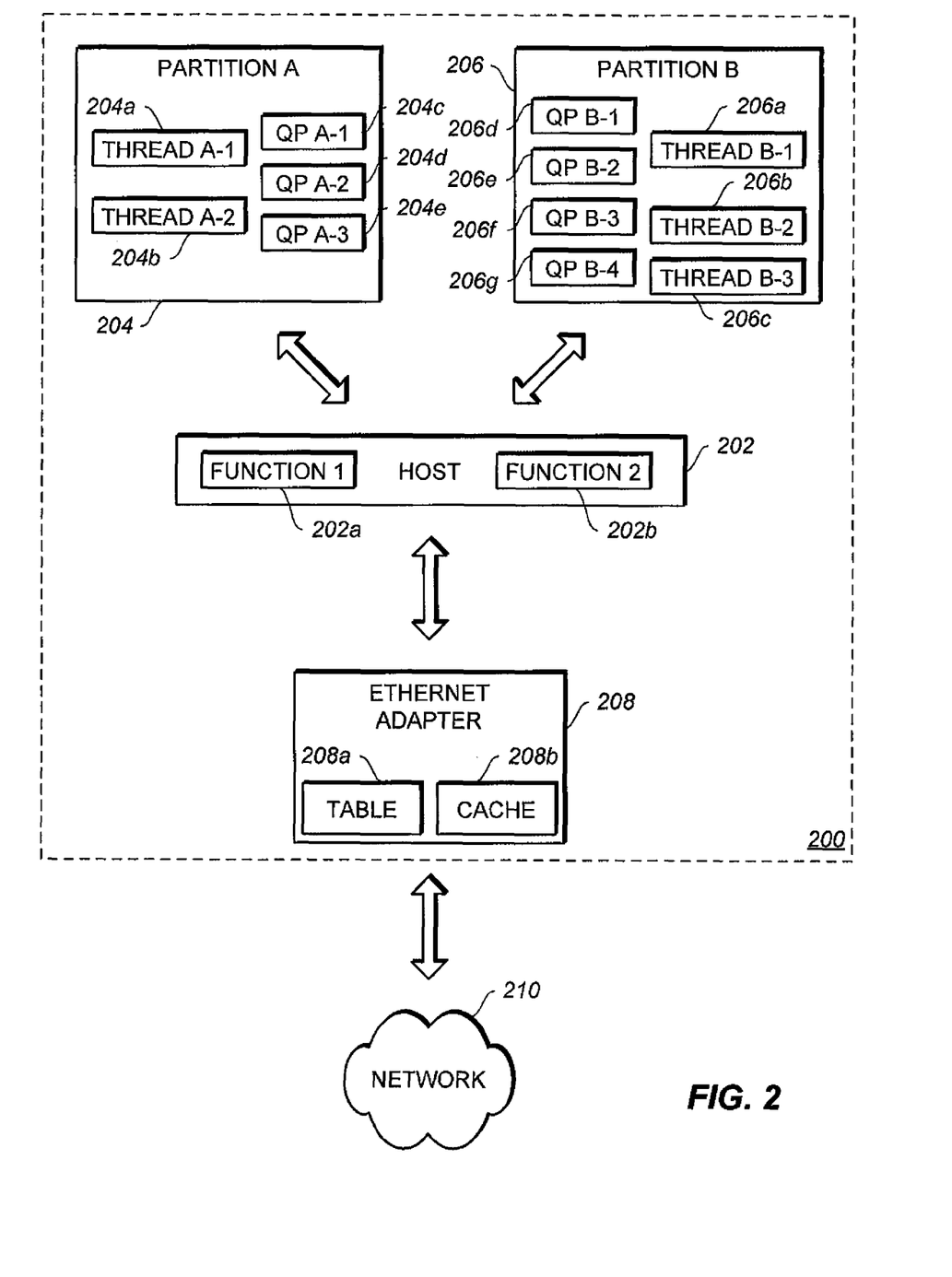
FIG. 2 illustrates a system according to an implementation of the invention.

Shown in FIG. 2 is a system 200 according to an implementation of the invention. System 200 includes a host 202 in communication with logical partitions 204-206 and an Ethernet adapter 208. Logical partition 204 includes threads 204a-204b and queue pairs 204c-204e. Logical partition 206 includes threads 206a-206c and queue pairs 206d-206g. One of the queue pairs in each logical partition acts as a default queue pair for the logical partition. Logical partitions 204 and 206 may each include more or less threads and/or queue pairs in other implementations.

Ethernet adapter 208 includes a connection table 208a and a connection cache 208b and is shared by threads 204a-204b and 206a-206c. Also included in Ethernet adapter 208 is a physical port (not shown) that is interfacing with a network 210 and a plurality of logical ports (not shown). More than one physical port may be included in Ethernet adapter 208. Each of the partitions 204 and 206 is assigned at least one of the plurality of logical ports. If more than one logical port is assigned to a partition, threads executing on the partition may utilize different logical ports. Other components, such as a switch, may be included in Ethernet adapter 208 even though they are not shown.

Host 202 includes a first function 202a operable to add a connection to connection table 208a of Ethernet adapter 208 and associate the connection with a queue pair. A second function 202b is also included in host 202. Second function 202b is operable to delete a connection from connection table 208a of Ethernet adapter 208. Functions 202a-202b are invocable by threads 204a-204b and 206a-206b in partitions 204 and 206. Host 202 may include other functions that are not shown.

Other components (not shown), such as memory, processor, hard disk, etc., may be included in system 200, which can be utilized in conjunction with host 202, partitions 204-206, and Ethernet adapter 208. For instance, although connection table 208a is illustrated in FIG. 2 as being within Ethernet adapter 208, connection table 208a may be located in a memory of system 200 that is accessible by Ethernet adapter 208. Additionally, as discussed above, portions of a memory of system 200 can be used to serve as queue pairs 204c-204e and 206d-206g. Further, other partitions and Ethernet adapters (not shown) may be included in system 200 and Ethernet adapter 208 may be interfacing with other network(s) (not shown).

Figure 3:
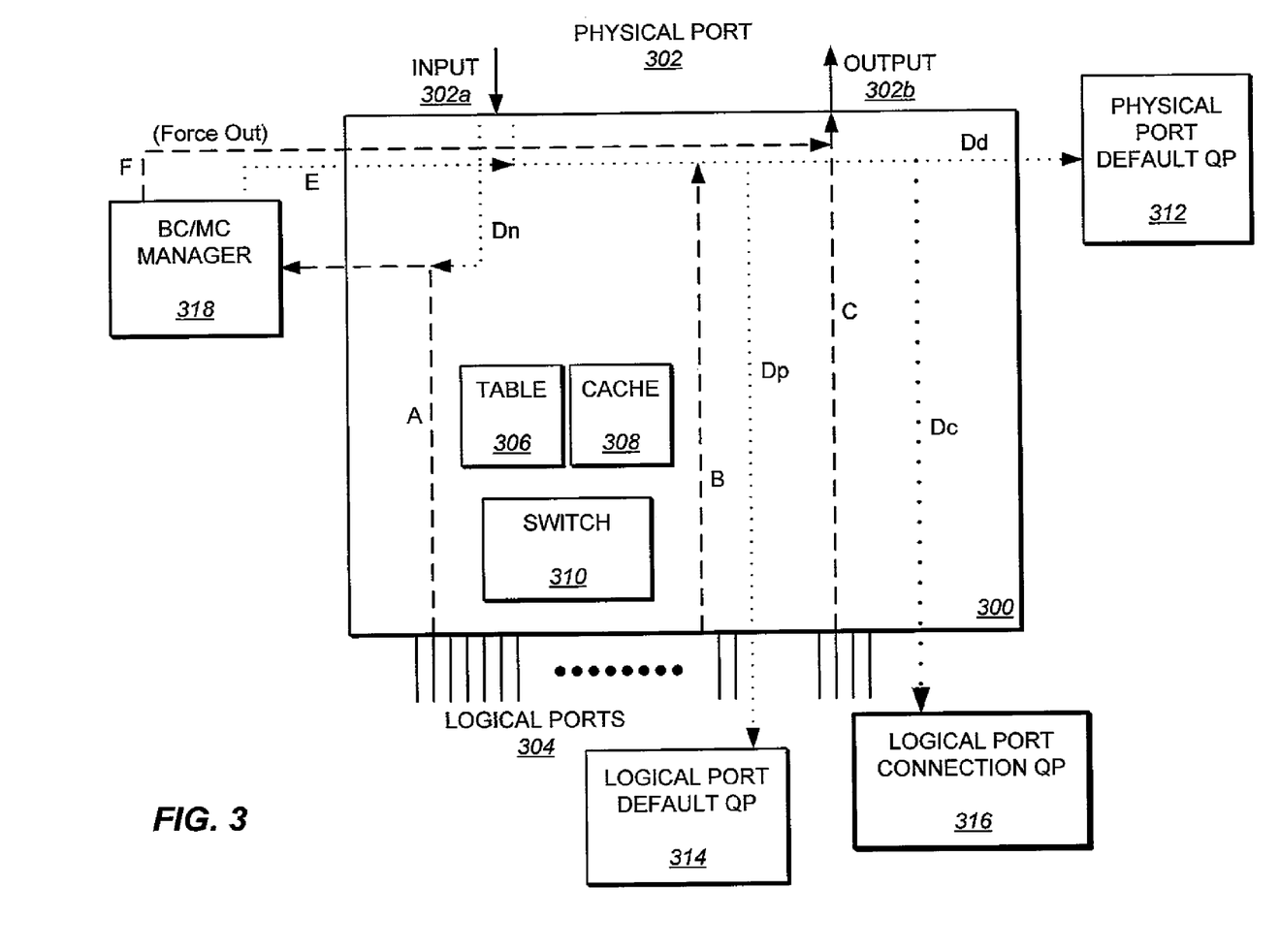
FIG. 3 shows an Ethernet adapter according to an implementation of the invention.

FIG. 3 illustrates an Ethernet adapter 300 according to an implementation of the invention. Ethernet adapter 300 includes a physical port 302 with an input 302a and an output 302b. Physical port 302 provides an interface with any network utilizing the Ethernet protocol. In addition, Ethernet adapter 300 includes a plurality of logical ports 304. Each logical port 304, which may be identified with a 16-bit port number and assigned to a logical partition (not shown), provides accessibility to physical port 302 and thus to a network.

Ethernet adapter 300 also includes a table 306, a cache 308, and a switch 310. Both table 306 and cache 308 are operable to store information relating to connections established through Ethernet adapter 300. Cache 308, however, is smaller and only stores information relating to most recently used connections. In one implementation, table 306 is located outside of Ethernet 300, such as in a system memory (not shown).

Switch 310 embodies logic for routing packets transmitted and received by Ethernet adapter 300. Port-to-port connectivity between logical ports 304 is provided by switch 310. Thus, a packet can be transmitted from one logical port to another logical port without having to transit physical port 302. This type of transmission is sometimes referred to as a wrap.

In one implementation, a packet, also referred to as a message, is a string of 8-bit bytes, which includes one or more header sections that contain addressing information and other control settings. Addressing information may include media access control (MAC) address and MAC type, e.g., broadcast (BC), multicast (MC), or unicast (UC). Broadcast packets are packets addressed to all recipients on a network. Multicast packets are packets addressed to a specific group of recipients on the network. Unicast packets are packets addressed to a single recipient on the network. Table 306 and cache 308 in Ethernet adapter 300 are only used to store connection information relating to unicast packets in one implementation.

One of the control settings in a packet may be a virtual local area network (VLAN) identifier (ID). In one implementation, a VLAN ID is an integer value in the range of 0-4,095. Another control setting could be a tag that indicates the presence or absence of a VLAN ID. A packet is considered to be tagged when a VLAN ID is present and is considered to be untagged when a VLAN ID is not present. Thus, a tagged packet is capable of being segregated into 4,096 virtual LANs. A virtual LAN may also have associations where packet destinations are allowed or disallowed, and thus the flow and replication of such a packet is affected.

A default queue pair (QP) 312 for physical port 302, a default QP 314 for one of the logical ports 304, a connection QP 316 for one of the logical ports 304, and a broadcast/multicast (BC/MC) manager 318 are further illustrated in FIG. 3. BC/MC manager 318 handles routing of broadcast and multicast packets received by Ethernet adapter 300. In one implementation, BC/MC manager 318 is incorporated into a host or hypervisor of a computer system, such as host 202 in FIG. 2.

Various inputs (dotted lines) and outputs (dashed lines) are illustrated in FIG. 3 to represent packets being routed through Ethernet adapter 300. Flow A is a BC/MC output packet from one of the logical ports 304. Flow B is a UC output packet from one of the logical ports 304 that becomes an input packet as if it had been received from physical port 302 (i.e., a wrap). Flow C is a UC output packet from one of the logical ports 304. Flow Dc is a UC input packet received via physical port 302 or came from flow B that is destined for one of the logical ports 304 and a specific connection of that logical port.

Flow Dd is a UC input packet received via physical port 302 or came from flow B, whose destination is not determined. Flow Dn is a BC/MC input packet from physical port 302. Flow Dp is a UC input packet received via physical port 302 or came from flow B that is destined for one of the logical ports 304, but not any particular connection. Flow E is a BC/MC input packet destined for one of the logical ports 304. Flow F is a BC/MC output packet to be outputted by physical port 302.

The inputs and outputs illustrated in FIG. 3 can also be viewed as designating one of the following packets:
- A broadcast/multicast (BC/MC) packet that arrived via input 302a of physical port 302, which then proceeds to BC/MC manager 318 (flow Dn).
- A unicast (UC) packet that arrived via physical port input 302a or is a wrap (flow B), which then proceeds to physical port default queue pair (QP) 312 (flow Dd), logical port default QP 314 (flow Dp), or logical port connection QP 316 (flow Dc).
- A BC/MC packet sent by BC/MC manager 318, which proceeds to one of the logical ports 304 (flow E).
- A BC/MC packet sent from one of the logical ports 304, which then proceeds to BC/MC manager 318 (flow A).
- A BC/MC packet sent by BC/MC manager 318, which then proceeds to output 302b of physical port 302 (flow F).
- A UC packet sent from one of the logical ports 304, which then proceeds to wrap (flow B).
- A UC packet sent from one of the logical ports 304, which then proceeds to physical port output 302b (flow C).

In the implementation of FIG. 3, all packets received at physical port 302 are subject to the following:
- For a UC packet, a destination MAC (DMAC) lookup is performed to determine a destination logical port. The lookup may involve a search of a set of MAC addresses of logical ports 304 associated with physical port 302. A successful lookup may also determine a destination default QP that corresponds to the destination port and may or may not be superseded by filtering applied in subsequent processing of the packet or in a subsequent determination that a connection exists.
- For a BC/MC packet, DMAC lookup is not performed. If a BC/MC packet survives physical port 302 filtering, it is routed to BC/MC manager 318, which has registration information that specifies how the packet is to be processed.
- A recirculated BC/MC packet (flow E) is not subject to any functions of switch 310 that might otherwise cause the packet to be discarded. Since the packet is directed to a logical port, it remains subject to filtering controls of the logical port.

Filters may be implemented at physical port 302. BC packets may be subject to the following filters:
- BC MAC filtering—All broadcast packets received by physical port 302 are discarded
- Untagged packet discard—All untagged broadcast packets received by physical port 302 are discarded
- Tagged packet discard—All tagged broadcast packets received by physical port 302 are discarded
- Tagged packet filtering—All tagged broadcast packets received by physical port 302 are filtered via a BC-VLAN filter (not shown)

If a BC packet survives filtering placed on physical port 302, a default queue pair (QP) (not shown) of BC/MC manager 318 is valid, and a receive queue (RQ) of the default BC/MC QP has an available work queue element (WQE), i.e., an available slot in the queue, the BC packet is placed on the RQ of the default BC/MC QP (flow Dn). Otherwise the BC packet is discarded. If a BC packet is re-circulated by BC/MC manager 318 (flow E), it is tagged to a destination logical port, similar to a DMAC match, and thus becomes subject to additional filtering according to the logical port controls. Such processing is similar to treatment of a UC packet where the destination logical port is determined.

Multicast (MC) packets received at physical port 302 may be subject to the following filters:
- MC MAC filtering—All multicast packets received by physical port 302 are filtered based on MAC address, e.g., all packets with a certain MAC address are discarded or all packets with a particular MAC address are passed
- Untagged packet discard—All untagged multicast packets received by physical port 302 are discarded
- Tagged packet discard—All tagged multicast packets received by physical port 302 are discarded
- Tagged packet filtering—All tagged multicast packets received by physical port 302 are filtered via an MC-VLAN filter (not shown)

If an MC packet survives filtering placed on physical port 302, a default queue pair (QP) (not shown) of BC/MC manager 318 is valid, and a receive queue (RQ) of the default BC/MC QP has an available work queue element (WQE), the MC packet is placed on the RQ of the default BC/MC QP (flow Dn). Otherwise the MC packet is discarded. If an MC packet is re-circulated by BC/MC manager 318 (flow E), it is tagged to a destination logical port, similar to a DMAC match, and thus becomes subject to additional filtering according to the logical port controls. Such processing is similar to treatment of a UC packet where the destination logical port is determined.

Unicast (UC) packets received at physical port 302 may be subject to the following filters:
- UC MAC filtering with unknown destination port—All unicast packets received by physical port 302 with an unknown destination port are filtered based on MAC address, e.g., all packets with a certain MAC address are discarded or all packets with a particular MAC address are passed
- Untagged packet with unknown destination port discard—All untagged unicast packets received by physical port 302 with an unknown destination port are discarded
- Untagged packet with known destination port discard—All untagged unicast packets received by physical port 302 with a known destination port are discarded
- Tagged packet with unknown destination port discard—All tagged unicast packets received by physical port 302 with an unknown destination port are discarded Tagged packet with known destination port discard—All tagged unicast packets received by physical port 302 with a known destination port are discarded Tagged packet with unknown destination port filtering—All tagged unicast packets received by physical port 302 with an unknown destination port are filtered via a UC-VLAN filter (not shown)

Tagged packet with known destination port filtering—All tagged unicast packets received by physical port 302 with a known destination port are filtered via a VLAN filter of the known destination port If a UC packet with an unknown destination port survives filtering placed on physical port 302, a default unicast (UC) queue pair (QP) of physical port 302 is valid, such as default QP 312, and a receive queue (RQ) of the default UC QP has an available work queue element (WQE), the UC packet is placed on the RQ of the default UC QP. Otherwise the UC packet is discarded.

If a UC packet with a known destination logical port survives filtering placed on physical port 302, no connection exists, a default logical port queue pair (QP) of the known destination logical port is valid, for example, default logical port QP (314), and a receive queue (RQ) of the default logical port QP has an available work queue element (WQE), the UC packet is placed on the RQ of the default logical port QP. Otherwise the UC packet is discarded.

If a UC packet with a known destination port survives filtering placed on physical port 302, a connection exists, a connection queue pair (QP) associated with the connection is valid, such as connection QP (316), and a receive queue (RQ) of the connection QP has an available work queue element (WQE), the UC packet is placed on the RQ of the connection QP. Otherwise the UC packet is discarded.

Although flow B in FIG. 3 is a wrap, it still represents a packet outputted from one of the logical ports 304. Therefore, receipt of the packet at a wrapped-to destination is subject to the same logical port filtering as if the packet had arrived from physical port 302.

Below is a sample hypervisor call "H_ADD_CONN" that can be used to add a connection to a connection cache of an Ethernet adapter and associate the connection with a queue pair.

When the "H_ADD_CONN" function is invoked to add a connection to a connection table of an Ethernet adapter, the function uses the input parameters to establish a representation in the specified adapter of a connection and associates the connection with the specified queue pair (QP). One or more connections may be associated with the same queue pair, but only one queue pair can be associated with any arbitrary connection.

A return code for "H_ADD_CONN" is a 64-bit unsigned binary integer, which will report one of the following conditions:

Successful completion—connection created
Invalid adapter handle
Invalid queue pair handle
Invalid IP port number
Invalid protocol parameter
Invalid port number
Connection exists
Insufficient connection recording resources
Connection locking rejected
Not authorized
Function not available
Adapter not operational The "H_ADD_CONN" hypervisor call includes nine parameters. The "Adapter Handle" parameter is a 64-bit unsigned binary integer that identifies an Ethernet adapter. If the specified adapter handle is not valid, the function fails and the return code is set to the "invalid adapter handle" condition. The "Port Number" parameter is a 16-bit unsigned binary integer in the range of 1-65,535 that identifies a logical port within the specified Ethernet adapter. If the specified port is not valid, the function fails and the return code is set to the "invalid port number" condition.

The "Source IP Address" (SA) parameter is a 32-bit unsigned binary integer that specifies the source IP address of the connection being added. The "Source IP Port" (SP) parameter is a 16-bit unsigned binary integer that specifies the source IP port number of the connection being added. If the specified IP port is not valid, the function fails and the return code is set to the "invalid IP port number" condition.

The "Destination IP Address" (DA) parameter is a 32-bit unsigned binary integer that specifies the destination IP

```
uint 64                              /*H_Success: Successful completion, interrupt not
                                     pending*/
                                     /*H_Adapter_Parm: Invalid adapter handle*/
                                     /*H_Port_Parm: Invalid port*/
                                     /*H_Parameter: Invalid IP port*/
                                     /*H_Protocol_Parameter: Invalid protocol parameter*/
                                     /*H_Qp_Parm: Invalid QP handle*/
                                     /*H_Not_Available: Connection already established*/
                                     /*H_Not_Enough_Resources: Insufficient connection
                                     space*/
                                     /*H_Resource: Connection locking rejected*/
                                     /*H_Authority: Not authorized*/
                                     /*H_Function: Function not available*/
                                     /*H_Hardware: Adapter not operational*/
hcall (const uint32 H_ADD_CONN,      /*Function called*/
   uint64 Adapter Handle,            /*Specifies adapter identifier*/
   uint16 Port Number,               /*Specifies logical port identifier*/
   uint32 Source IP Address,         /*Source IP address*/
   uint16 Source IP Port,            /*Source IP port number*/
   uint32 Destination IP Address,    /*Destination IP address*/
   uint16 Destination IP Port,       /*Destination IP port number*/
   uint8 Modifier Key,               /*Key information (cache lock)*/
   uint8 Protocol,                   /*Connection protocol*/
   uint64 QP Handle)                 /*Specifies queue pair identifier*/
``` address of the connection being added. The "Destination IP Port" (DP) parameter is a 16-bit unsigned binary integer that specifies the destination IP port number of the connection being added. If the specified IP port is not valid, the function fails and the return code is set to the "invalid IP port number" condition.

The "QP Handle" parameter is a 64-bit unsigned binary integer that identifies a queue pair. If the specified QP handle is not valid, the function fails and the return code is set to the "invalid queue pair handle" condition. The "Modifier Key" parameter is an 8-bit unsigned binary integer that specifies additional parameters to be associated with the connection:

Bit 0=no lock, 1=lock connection in cache
Bits 1-7—Reserved

The "Protocol" parameter is an 8-bit unsigned binary integer that specifies the protocol to be associated with the connection:

0—Reserved
1—SYN connection
2—UDP connection
3—TCP connection
4-255—Reserved

A SYN connection is an initiating connection. SYN packets typically flow at the very beginning of a connection and are identified based on whether a flag in a packet header is set. By adding a SYN connection entry to a connection cache, SYN packets can be directed to a connection initiation manager. A SYN entry can be either a 2-tuple (DP) or a 3-tuple (DA, DP).

Below is a table listing the parameters of the "H_ADD_CONN" function.

| Parameters | Size (Bits) |
|---|---|
| Adapter Handle (R4) | 64 |
| Port Number (R5: $b_{48}$-$b_{63}$) | 16 |
| Source IP Address (R6: $b_0$-$b_{31}$) | 32 |
| Source IP Port (R6: $b_{48}$-$b_{63}$) | 16 |
| Destination IP Address (R7: $b_0$-$b_{31}$) | 32 |
| Destination IP Port (R6: $b_{48}$-$b_{63}$) | 16 |
| Modifier Key (R8: $b_{48}$-$b_{55}$) | 8 |
| Protocol (R8: $b_{56}$-$b_{63}$) | 8 |
| QP Handle (R9) | 64 |

If the function is not provided, the return code is set to the "function not available" condition. If the port number specified is not valid for the logical partition from which the function is initiated, the return code is set to the "invalid port number" condition. If a reserved protocol is specified, the return code is set to the "invalid protocol parameter" condition. If the specified adapter already has a connection established, as determined by the applicable combination of the source and destination addresses and ports, the return code is set to the "connection exists" condition. If adapter resources for recording a connection are exhausted (e.g., the connection table is full), the return code is set to the "insufficient connection recording resources" condition.

If connection cache entry locking is requested and the requestor is not authorized, the return code is set to the "not authorized" condition. If system resources for locking a connection cache entry are exhausted, the return code is set to the "connection locking rejected" condition. Locking of a connection cache entry may be restricted because the cache size is limited and as such, locking depletes the cache resources for all sharing threads. Additionally, as the number of locked entries increases, negative performance consequences will more likely result.

If the SYN protocol is specified and the destination IP address (DA) is zero, a 2-tuple SYN connection is recorded (port and SYN protocol), the source IP address (SA) and source IP port (SP) parameters are ignored. If the SYN protocol is specified and the destination IP address (DA) is non-zero, a 3-tuple SYN connection is recorded (DA, port, and SYN protocol), the source IP address (SA) and source IP port (SP) parameters are ignored. If the UDP protocol is specified, a 6-tuple full connection is recorded (SA, SP, DA, DP, port, and UDP protocol). If the TCP protocol is specified, a 6-tuple full connection is recorded (SA, SP, DA, DP, port, and TCP protocol). If a connection is recorded and a QP is associated with the connection, the return code is set to the "successful completion" condition.

Figure 4:
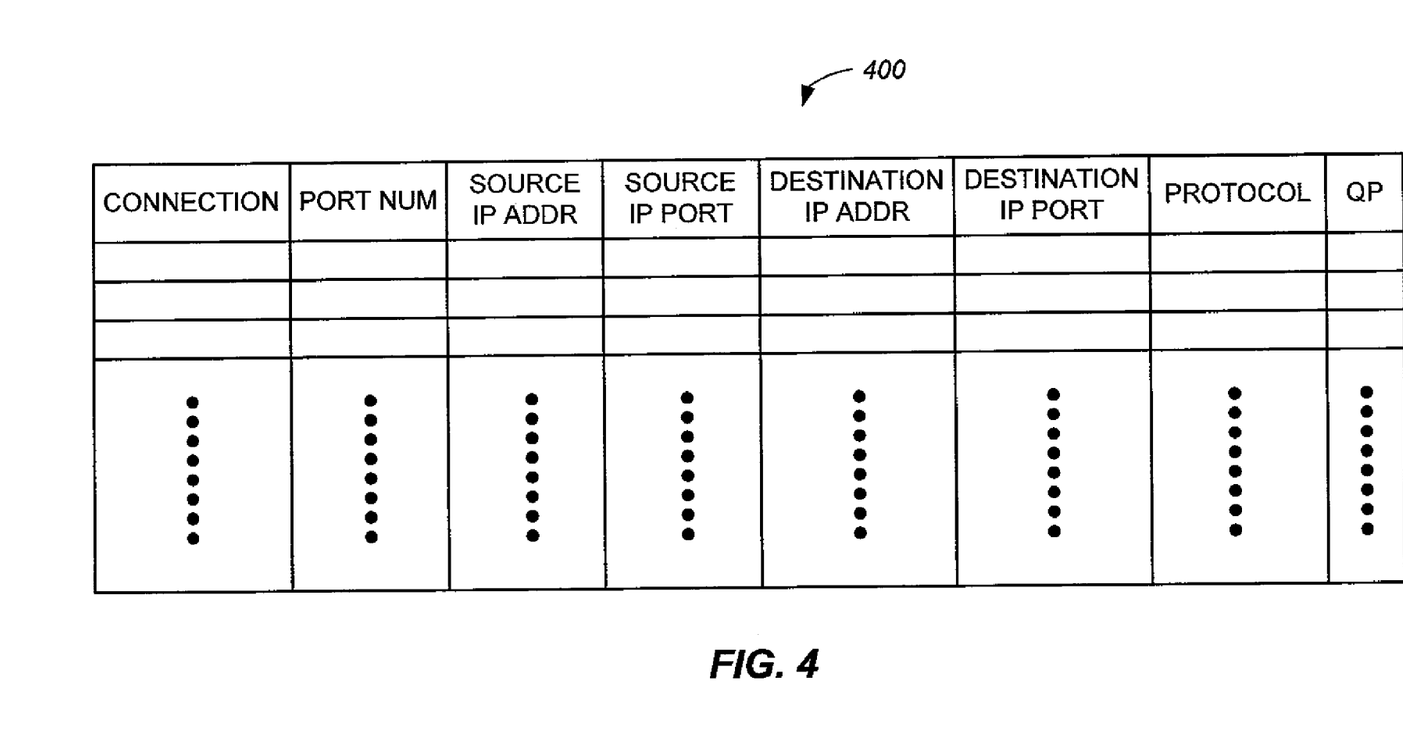
FIG. 4 depicts a connection table of an Ethernet adapter according to an implementation of the invention.

Depicted in FIG. 4 is a connection table 400 of an Ethernet adapter according to an implementation of the invention. In the implementation, connection table 400 is a table with columns corresponding to different information related to a connection, such as logical port number, source IP address, source IP port, destination IP address, destination IP port, key, and queue pair identifier. There is an additional column "Connection" to act as an indexing column. Each row in connection table 400 represents a connection. Other implementations of connection table 400 may include more or less columns of information. For example, the "Connection" column can be removed. A connection cache of an Ethernet adapter may also be in table form, similar to connection table 400.

Below is a sample hypervisor call "H_DEL_CONN" that can be used to remove a connection from a connection cache of an Ethernet adapter.

```
uint 64                                    /*H_Success: Successful completion, interrupt not
                                           pending*/
                                           /*H_Adapter_Parm: Invalid adapter handle*/
                                           /*H_Port_Parm: Invalid port*/
                                           /*H_Parameter: Invalid IP port*/
                                           /*H_Protocol_Parameter: Invalid protocol parameter*/
                                           /*H_Qp_Parm: Invalid QP handle*/
                                           /*H_Not_Available: Connection already established*/
                                           /*H_Not_Enough_Resources: Insufficient connection
                                           space*/
                                           /*H_Function: Function not available*/
                                           /*H_Hardware: Adapter not operational*/
hcall (const uint32 H_DEL_CONN,            /*Function called*/
    uint64 Adapter Handle,                 /*Specifies adapter identifier*/
    uint16 Port Number,                    /*Specifies logical port identifier*/
    uint32 Source IP Address,              /*Source IP address*/
    uint16 Source IP Port,                 /*Source IP port number*/
    uint32 Destination IP Address,         /*Destination IP address*/
```

-continued

| | |
|---|---|
| uint16 Destination IP Port, | /*Destination IP port number*/ |
| uint8 Protocol, | /*Connection protocol*/ |
| uint64 QP Handle) | /*Specifies queue pair identifier*/ |

When the "H_DEL_CONN" function is invoked to remove a connection from a connection table of an Ethernet adapter, the function uses the input parameters to locate a representation in the specified adapter of a connection that is also associated with the specified queue pair. If found, the representation of the connection is removed.

A return code for "H_DEL_CONN" is a 64-bit unsigned binary integer, which will report one of the following conditions:

Successful completion—connection removed
Invalid adapter handle
Invalid queue pair handle
Invalid IP port number
Invalid protocol parameter
Invalid port number
Connection not found
Function not available
Adapter not operational The "H_DEL_CONN" hypervisor call includes eight parameters. The "Adapter Handle" parameter is a 64-bit unsigned binary integer that identifies an Ethernet adapter. If the specified adapter handle is not valid, the function fails and the return code is set to the "invalid adapter handle" condition. The "Port Number" parameter is a 16-bit unsigned binary integer in the range of 1-65,535 that identifies a logical port within the specified Ethernet adapter. If the specified port is not valid, the function fails and the return code is set to the "invalid port number" condition.

The "Source IP Address" (SA) parameter is a 32-bit unsigned binary integer that specifies the source IP address of the connection being removed. The "Source IP Port" (SP) parameter is a 16-bit unsigned binary integer that specifies the source IP port number of the connection being removed. If the specified IP port is not valid, the function fails and the return code is set to the "invalid IP port number" condition.

The "Destination IP Address" (DA) parameter is a 32-bit unsigned binary integer that specifies the destination IP address of the connection being removed. The "Destination IP Port" (DP) parameter is a 16-bit unsigned binary integer that specifies the destination IP port number of the connection being removed. If the specified IP port is not valid, the function fails and the return code is set to the "invalid IP port number" condition.

The "QP Handle" parameter is a 64-bit unsigned binary integer that identifies a queue pair. If the specified QP handle is not valid, the function fails and the return code is set to the "invalid queue pair handle" condition. The "Protocol" parameter is an 8-bit unsigned binary integer that specifies the protocol associated with the connection being removed. A specified protocol causes other specified parameters to be used in forming the matching criteria by which an existing connection may be found:

0—Reserved
1—SYN connection—Match on SYN protocol and port when DA is zero. Match on SYN protocol, port, and DA when DA is non-zero.
2—UDP connection—Match on UDP protocol, port, SA, SP, DA, and DP
3—TCP connection—Match on TCP protocol, port, SA, SP, DA, and DP
4-255—Reserved Below is a table listing the parameters of the "H_DEL_CONN" function.

| Parameters | Size (Bits) |
|---|---|
| Adapter Handle (R4) | 64 |
| Port Number (R5: $b_{48}$-$b_{63}$) | 16 |
| Source IP Address (R6: $b_0$-$b_{31}$) | 32 |
| Source IP Port (R6: $b_{48}$-$b_{63}$) | 16 |
| Destination IP Address (R7: $b_0$-$b_{31}$) | 32 |
| Destination IP Port (R6: $b_{48}$-$b_{63}$) | 16 |
| Protocol (R8: $b_{56}$-$b_{63}$) | 8 |
| QP Handle (R9) | 64 |

If the function is not provided, the return code is set to the "function not available" condition, If the port number specified is not valid for the logical partition from which the function is initiated, the return code is set to the "invalid port number" condition. If a reserved protocol is specified, the return code is set to the "invalid protocol parameter" condition. If the specified adapter does not have a connection established, as determined by the specified protocol and the additional parameters determined from the protocol which are used as matching criteria, the return code is set to the "connection not found" condition. If a connection matching the specified parameters is removed, the return code is set to the "successful completion" condition.

Both the sample "H_ADD_CONN" hypervisor call and the sample "H_DEL_CONN" hypervisor call implement TCP connections. When other connection types are used, different connection identifiers may be required. For example, the "IP source address" may be replaced with an equivalent identifier for the connection type used.

The invention can take the form of an entirely hardware implementation, an entirely software implementation, or an implementation containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 5:
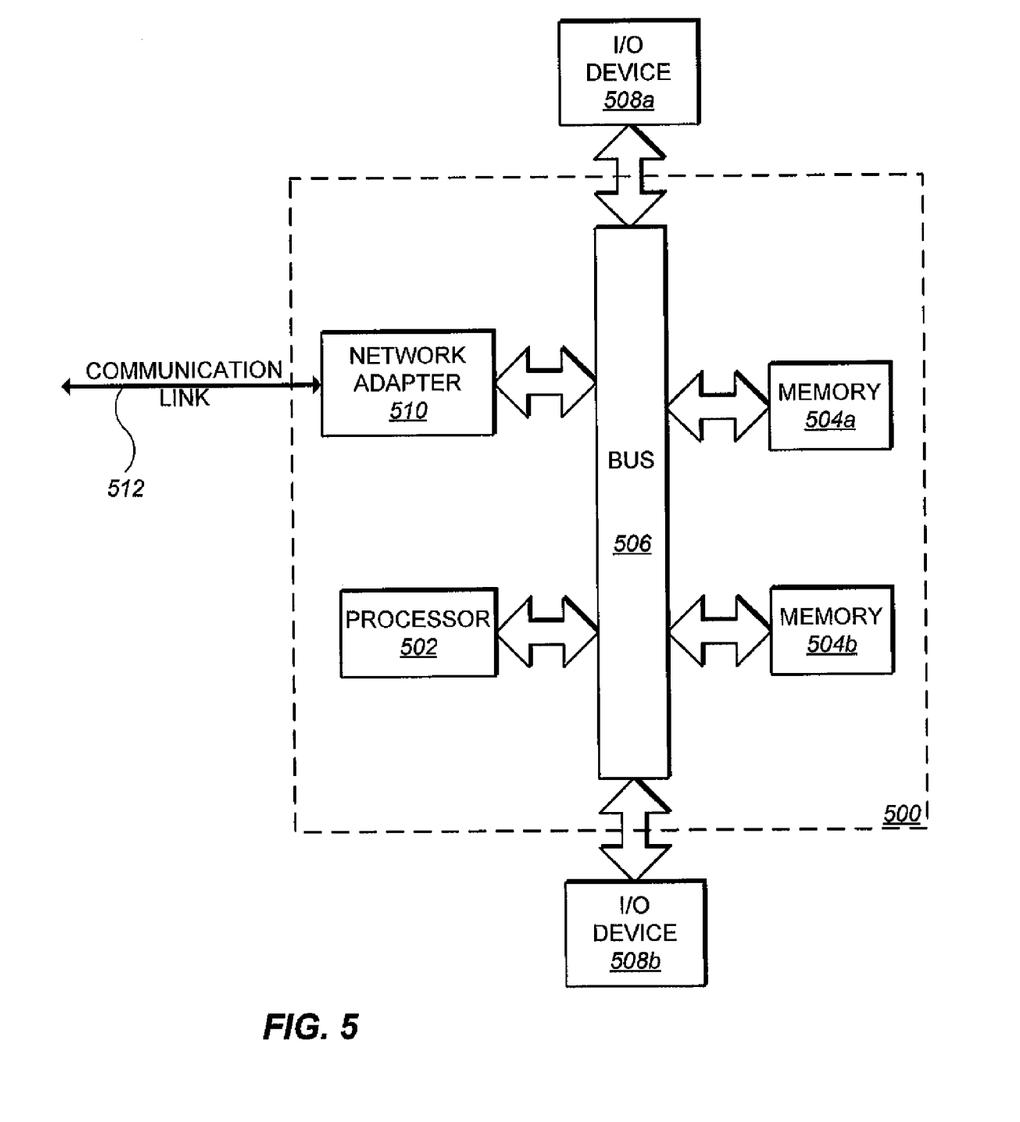
FIG. 5 illustrates a block diagram of a data processing system with which implementations of the invention can be implemented.

Shown in FIG. 5 is a data processing system 500 suitable for storing and/or executing program code. Data processing system 500 includes a processor 502 coupled to memory elements 504a-b through a system bus 506. In other implementations, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

While various implementations for managing packets received by an Ethernet adapter have been described, the technical scope of the present invention is not limited thereto. Various modifications or improvements can be added to the above implementations and those modifications or improvements fall within the technical scope of the present invention

What is claimed is:

1. A method for managing packets received by an Ethernet adapter shared by a plurality of threads, wherein each of the plurality of threads is executing on a logical partition of a computer system, the method comprising:
providing a first function operable to add a connection to a connection table of the Ethernet adapter and associate the connection with a queue pair (QP) comprising a receive queue and a send queue, wherein the first function includes a logical port number parameter and a QP handle parameter, wherein the logical port number parameter identifies a logical port of the Ethernet adapter and the QP handle parameter identifies the queue pair;
providing a second function, including the logical port number and QP handle parameters, operable to remove the connection from the connection table of the Ethernet adapter;
invoking the first function by a one of the plurality of threads, including specifying values for the logical port number and QP handle parameters by the one of the plurality of threads to identify the connection and associated queue pair, wherein the Ethernet adapter is operable to route any packet corresponding to the connection received by the Ethernet adapter to the queue pair associated with the connection responsive to the connection being in the connection table, thereby routing any packet corresponding to the connection received by the Ethernet adapter to the queue pair for the thread invoking the first function without first routing such packet to a default queue pair of the logical partition on which the thread is executing; and
invoking the second function by the one of the plurality of threads.

2. The method of claim 1, wherein the first function and the second function each comprises:
one or more fields identifying the connection; and
at least one other field specifying the queue pair identifier.

3. The method of claim 1, wherein the plurality of threads are executing on a plurality of logical partitions, each of the plurality of logical partitions being assigned at least one of a plurality of logical ports of the Ethernet adapter.

4. The method of claim 3, wherein the one of the plurality of threads is an application executing on one of the plurality of logical partitions.

5. The method of claim 1, wherein the first function is further operable to lock the connection in a connection cache of the Ethernet adapter.

6. The method of claim 1, wherein the queue pair comprises a receive queue and a send queue.

7. The method of claim 1, wherein the first function and the second function are hypervisor calls.

8. A system comprising:
an Ethernet adapter shared by a plurality of threads, wherein each of the plurality of threads is executing on a logical partition of a computer system, the Ethernet adapter including a connection table storing information relating to one or more connections established by one or more of the plurality of threads, wherein each of the plurality of threads is executing on a logical partition of a computer system;
a hypervisor in communication with the Ethernet adapter and the plurality of threads, the hypervisor including
a first function operable to add a connection to the connection table of the Ethernet adapter and associate the connection with a queue pair (QP) comprising a receive queue and a send queue, wherein the first function includes a logical port number parameter and a QP handle parameter, wherein the logical port number parameter identifies a logical port of the Ethernet adapter and the QP handle parameter identifies the queue pair, and
a second function, including the logical port number and QP handle parameters, operable to remove the connection from the connection table of the Ethernet adapter, and
a one of the plurality of threads, operable to invoke the first function, including providing values for the logical port number and QP handle parameters to identify the connection and associated queue pair, wherein the Ethernet adapter is operable to route any packet corresponding to the connection received by the Ethernet adapter to the queue pair associated with the connection responsive to the connection being in the connection table, thereby routing any packet corresponding to the connection received by the Ethernet adapter to the queue pair for the thread invoking the first function without first routing such packet to a default queue pair of the logical partition on which the thread is executing, and
invoke the second function.

9. The system of claim 8, wherein the first function and the second function each comprises:
one or more fields identifying the connection; and
at least one other field specifying the queue pair identifier.

10. The system of claim 8, wherein the plurality of threads are executing on a plurality of logical partitions, each of the plurality of logical partitions being assigned at least one of a plurality of logical ports of the Ethernet adapter.

11. The system of claim 10, wherein the one of the plurality of threads is an application executing on one of the plurality of logical partitions.

12. The system of claim 8, wherein the first function is further operable to lock the connection in a connection cache of the Ethernet adapter.

13. The system of claim 8, wherein the queue pair comprises a receive queue and a send queue.

14. A computer program product comprising a non-transitory computer readable storage medium, the computer readable storage medium including a computer readable program for managing packets received by an Ethernet adapter shared by a plurality of threads, wherein each of the plurality of threads is executing on a logical partition of a computer system, wherein the computer readable program when executed on a computer causes the computer to:
provide a first function operable to add a connection to a connection table of the Ethernet adapter and associate the connection with a queue pair (QP) comprising a receive queue and a send queue, wherein the first function includes a logical port number parameter and a QP handle parameter, wherein the logical port number parameter identifies a logical port of the Ethernet adapter and the QP handle parameter identifies the queue pair;
provide a second function, including the logical port number and QP handle parameters, operable to remove the connection from the connection table of the Ethernet adapter;
invoke the first function by a one of the plurality of threads, including providing values for the logical port number and QP handle parameters by the one of the plurality of threads to identify the connection and associated queue pair, wherein the Ethernet adapter is operable to route any packet corresponding to the connection received by the Ethernet adapter to the queue pair associated with the connection responsive to the connection being in the connection table, thereby routing any packet corresponding to the connection received by the Ethernet adapter to the queue pair for the thread invoking the first function without first routing such packet to a default queue pair of the logical partition on which the thread is executing; and invoke the second function.

15. The computer program product of claim 14, wherein the first function and the second function each comprises:
one or more fields identifying the connection; and
at least one other field specifying the queue pair identifier.

16. The computer program product of claim 14, wherein the plurality of threads are executing on a plurality of logical partitions, each of the plurality of logical partitions being assigned at least one of a plurality of logical ports of the Ethernet adapter.

17. The computer program product of claim 16, wherein the one of the plurality of threads is an application executing on one of the plurality of logical partitions.

18. The computer program product of claim 14, wherein the first function is further operable to lock the connection in a connection cache of the Ethernet adapter.

19. The computer program product of claim 14, wherein the queue pair comprises a receive queue and a send queue.

20. The computer program product of claim 14, wherein the first function and the second function are hypervisor calls.

* * * * *